United States Patent
Isaji et al.

(10) Patent No.: US 7,925,413 B2
(45) Date of Patent: Apr. 12, 2011

(54) VEHICLE CONTROL SYSTEM

(75) Inventors: Kazuyoshi Isaji, Kariya (JP); Naohiko Tsuru, Handa (JP)

(73) Assignee: Denso Corporation, Kariya (JP)

( * ) Notice: Subject to any disclaimer, the term of this patent is extended or adjusted under 35 U.S.C. 154(b) by 894 days.

(21) Appl. No.: 11/897,350

(22) Filed: Aug. 30, 2007

(65) Prior Publication Data

US 2008/0059037 A1   Mar. 6, 2008

(30) Foreign Application Priority Data

Sep. 4, 2006 (JP) .................................. 2006-239420
May 14, 2007 (JP) .................................. 2007-128567

(51) Int. Cl.
*B60T 8/32* (2006.01)
*B60T 7/12* (2006.01)
*G06F 19/00* (2006.01)
*G08G 1/16* (2006.01)
*B60Q 1/00* (2006.01)

(52) U.S. Cl. .............. 701/93; 701/96; 701/36; 701/301; 340/903; 340/425.5; 342/70

(58) Field of Classification Search .................... 701/93, 701/96, 36, 301; 340/903, 425.5; 342/70
See application file for complete search history.

(56) References Cited

U.S. PATENT DOCUMENTS

| 5,661,650 A | 8/1997 | Sekine et al. |
| 5,710,565 A * | 1/1998 | Shirai et al. ........................ 342/70 |
| 5,854,987 A | 12/1998 | Sekine et al. |
| 5,878,361 A | 3/1999 | Sekine et al. |
| 5,878,362 A | 3/1999 | Sekine et al. |
| 5,928,299 A | 7/1999 | Sekine et al. |
| 6,037,975 A * | 3/2000 | Aoyama ........................ 348/113 |
| 6,459,365 B2 * | 10/2002 | Tamura ........................ 340/425.5 |
| 6,622,079 B2 * | 9/2003 | Minowa et al. .................. 701/96 |
| 6,684,149 B2 * | 1/2004 | Nakamura et al. .............. 701/96 |
| 6,714,139 B2 * | 3/2004 | Saito et al. ..................... 340/903 |
| 6,816,084 B2 * | 11/2004 | Stein .............................. 340/903 |
| 6,889,140 B2 * | 5/2005 | Isogai et al. .................. 701/301 |

(Continued)

FOREIGN PATENT DOCUMENTS

GB   2 343 016   4/2000

(Continued)

OTHER PUBLICATIONS

U.S. Appl. No. 11/805,236, filed May 22, 2007, Isaji et al.

(Continued)

*Primary Examiner* — Khoi Tran
*Assistant Examiner* — Ian Jen
(74) *Attorney, Agent, or Firm* — Harness, Dickey & Pierce, PLC

(57) ABSTRACT

A vehicle control system controls the speed of a vehicle according to actual road conditions and state of the vehicle. The control system acquires a present value of lateral acceleration occurring in a direction lateral to a controlled vehicle when the controlled vehicle avoids a collision with an obstacle or passes the obstacle. A target relative speed between the obstacle and the controlled vehicle is calculated from the present value of lateral acceleration and a turning radius of the controlled vehicle required for the controlled vehicle to avoid a collision with the obstacle or to pass the obstacle. Then, deceleration control is executed based on target relative deceleration rate at which the controlled vehicle is to be decelerated to reach the target relative speed.

3 Claims, 10 Drawing Sheets

U.S. PATENT DOCUMENTS

| | | | |
|---|---|---|---|
| 6,917,305 B2 * | 7/2005 | King | 340/903 |
| 7,046,822 B1 * | 5/2006 | Knoeppel et al. | 382/103 |
| 2004/0193374 A1 * | 9/2004 | Hac et al. | 701/301 |
| 2004/0225424 A1 * | 11/2004 | Yamamura et al. | 701/36 |
| 2005/0033516 A1 * | 2/2005 | Kawasaki | 701/301 |
| 2005/0273215 A1 * | 12/2005 | Kuge | 701/1 |
| 2006/0095195 A1 * | 5/2006 | Nishimura et al. | 701/96 |
| 2007/0021876 A1 | 1/2007 | Isaji et al. | |
| 2007/0191997 A1 | 8/2007 | Isaji et al. | |

FOREIGN PATENT DOCUMENTS

| | | |
|---|---|---|
| JP | 2006-175941 | 7/2006 |
| JP | 2006-201874 | 8/2006 |
| JP | 2006-244284 | 9/2006 |

OTHER PUBLICATIONS

Office Action dated Apr. 15, 2008 in Japanese Application No. 2006-239420 with English translation.

* cited by examiner

VEHICLE CONTROL SYSTEM

CROSS REFERENCE TO RELATED APPLICATION

This application is based on and incorporates herein by reference Japanese Patent Applications No. 2006-239420 filed on Sep. 4, 2006 and No. 2007-128567 filed on May 14, 2007.

FIELD OF THE INVENTION

The present invention relates to a vehicle control system.

BACKGROUND OF THE INVENTION

Various vehicle control systems for controlling the speed of a vehicle are proposed (for example, U.S. Pat. No. 5,928, 299 which corresponds to JP 3432881). A vehicle control system disclosed in U.S. Pat. No. 5,928,299 identifies the distance (estimated distance) required for a controlled vehicle to stop within a predetermined time when it is decelerated from a vehicle speed at predetermined deceleration rate. Then, the control system sets a reference node in a preliminary controlled vehicle position located ahead the position of the controlled vehicle by the estimated distance and also sets another reference node in a position located ahead the reference node by a distance (vehicle speed×predetermined time). The control system also obtains a passable vehicle speed at which the vehicle can travel the distance between the two reference nodes at acceleration rate equal or lower than reference lateral acceleration rate. When it is determined that there is a curve on the road ahead the vehicle and the vehicle speed is in the excess of the passable vehicle speed, automatic deceleration is executed by a vehicle speed control unit to ensure that the vehicle can pass through the curve safely.

This vehicle control system thus identifies a passable vehicle speed at which a vehicle can travel at acceleration rate equal to or lower than reference lateral acceleration rate. The passable vehicle speed can become higher or lower than a vehicle speed at which the vehicle can actually travel depending on the setting of the reference lateral acceleration rate. Therefore, the reference lateral acceleration rate must be set adequately, and vehicle speed control cannot be executed in accordance with actual road conditions and the state of the vehicle unless the reference lateral acceleration rate is adequately set.

The above vehicle control system however only determines a passable vehicle speed at which the vehicle can pass the curve at acceleration rate equal to or lower than the reference lateral acceleration rate. It cannot execute vehicle speed control taking the feel of danger that drivers will have on a curving road into account.

SUMMARY OF THE INVENTION

The present invention therefore has a primary object to provide a vehicle control system capable of vehicle speed control in accordance with the actual road conditions and the state of a vehicle.

The present invention also has a secondary object to provide a vehicle control system capable of reflecting the feel of danger that a driver will have when entering a curving road.

For attaining the primary object, according to a first aspect of the invention, a lateral G that exerts on a vehicle when traveling on a curving road is determined, and a target speed of the vehicle is determined based on the lateral G and a radius of curvature of the curving road. The vehicle is accelerated or decelerated by comparing an actual vehicle speed and the determined target speed.

For attaining the primary object, according to a second aspect of the invention, a lateral G that exerts on a vehicle when turning to avoid collision with an obstacle or passing the obstacle is determined, and a target relative speed of the vehicle is determined based on the lateral G and a radius of curvature of turning the vehicle to avoid the collision to pass the obstacle. The vehicle is decelerated to the target relative speed based on a target relative deceleration rate.

For attaining the primary object, according to a third aspect of the present invention, the first aspect and the second aspect are combined.

For attaining the secondary, when a vehicle enters a curving road, the vehicle is decelerated toward a target relative speed, which is set for traveling on the curving road, before reaching a curve entrance section short of an entrance of the curving road. In the curve entrance section short of the curving road, the vehicle is decelerated toward a higher target relative speed which is set to be higher than the target relative speed. Thus, the vehicle is decelerated sufficiently before reaching a point short of an entrance of the curve, and the deceleration of the vehicle is lowered in the curve entrance section. As a result, the vehicle is decelerated in a manner most fit with feel of danger of a driver.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
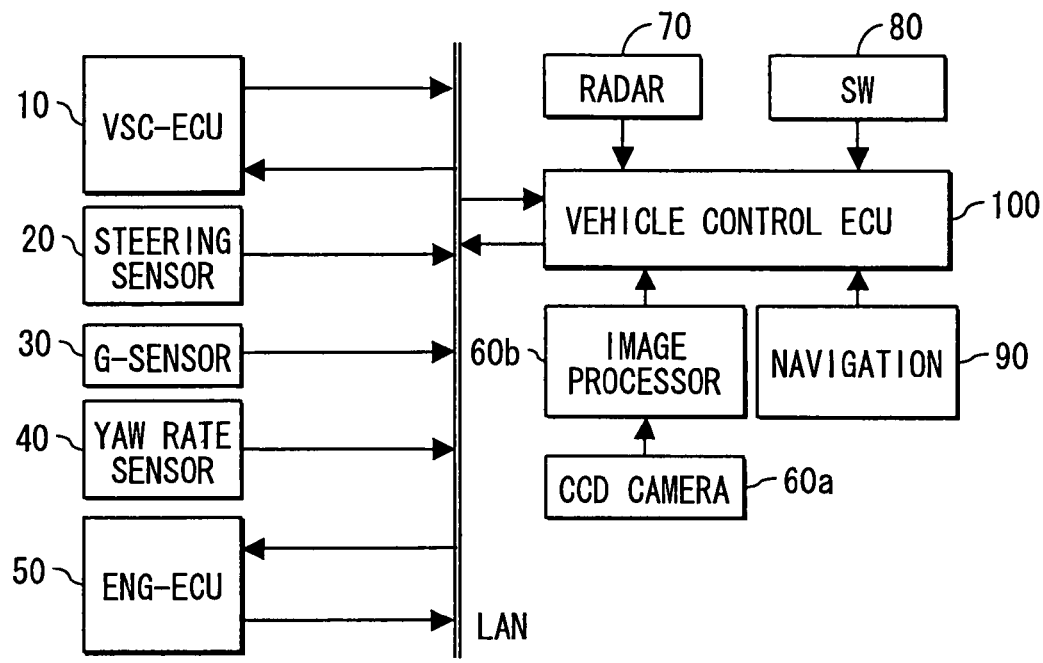
FIG. 1 is a block diagram showing a driving support system as a vehicle control system according to a first embodiment of the invention.

As shown in FIG. 1, a driving support system includes a VSC-ECU 10, a steering angle sensor 20, a G-sensor 30, a yaw rate sensor 40, an ENG-ECU 50, a CCD camera 60a, an image recognition processor 60b, a radar 70, operation switches 80, a navigation device 90, and a vehicle control ECU 100. This system is mounted on a vehicle (controlled vehicle), which is to be controlled.

The VSC-ECU 10 controls a brake actuator (not shown) which applies a braking force to the controlled vehicle, and it has a VSC (vehicle stability control which is a registered trademark) function for suppressing a side slip of the controlled vehicle. The VSC-ECU 10 receives information on a target deceleration rate through an in-vehicle LAN and controls a brake actuator such that the target deceleration is attained in the controlled vehicle. The VSC-ECU 10 also transmits information on the speed (vehicle speed) Vs0 and the brake pressure of the controlled vehicle to the in-vehicle LAN.

The steering angle sensor 20 detects information on the steering angle of the steering of the controlled vehicle, and it transmits the information on the steering angle thus detected to the in-vehicle LAN.

The G-sensor 30 detects acceleration rate occurring in the longitudinal direction (front-rear direction) of the controlled vehicle (longitudinal G) and acceleration rate occurring in a lateral direction (left-right direction) of the controlled vehicle (lateral G), and it transmits the longitudinal G and the lateral G thus detected to the in-vehicle LAN. The yaw rate sensor 40 detects the angular velocity of the controlled vehicle about a vertical axis (yaw rate), and it transmits the information on the yaw rate thus detected to the in-vehicle LAN.

The ENG-ECU 50 receives information on target acceleration rate through the in-vehicle LAN and controls a throttle actuator, which is not shown, such that the target acceleration rate is attained in the controlled vehicle. The CCD camera 60a is a photographic unit which photographs an image of a predetermined range in front of the controlled vehicle and outputs the photographic image to the image recognition processor 60b.

The image recognition processor 60b performs a predetermined image recognition process on the photographic image output from the CCD camera 60a. Thus, the processor recognizes, for example, a road boundary of a curving road ahead the controlled vehicle and an object appurtenant to the road provided in the neighborhood of the road such as a traffic lane line, pole, guardrail or curbstone and obtains relative positions of the road appurtenance and the controlled vehicle. The processor outputs information on the type of and relative position of the road appurtenance to the vehicle control ECU 100.

For example, the radar 70 irradiates the predetermined range in front of the controlled vehicle with laser light and receives resultant reflected light. The radar 70 thus detects the distance between the controlled vehicle and a road appurtenance such as a reflecting plate or delineator, which is provided at a road boundary of the curving road or in the neighborhood of the same and reflects light with intensity equal to or higher than a predetermined value. The radar 70 also detects the amount of displacement between the widthwise center axis of the controlled vehicle and the center axis of the road appurtenance (the amount of lateral displacement). The detected values are output to the vehicle control ECU 100.

The operation switches 80 are a group of switches operable by a driver, and information on operations of the switches is output to the vehicle control ECU 100. The navigation device 90 includes a position detecting unit including a terrestrial magnetism sensor, a gyroscope, a distance sensor, and a GPS receiver which are all not shown but well-known. The GPS receiver works with a global positioning system (GPS) for detecting the position of the controlled vehicle based on radio waves from a plurality of satellites. The navigation device 90 also includes a road map data storage unit for storing road map data, a color display utilizing a liquid crystal display or CRT, and a control circuit.

The road map data include link data and node data for representing roads on a map using links and nodes, and the link data and node data include information on the coordinates of starting points and end points of links, link lengths, traffic lane widths, and radii of curvature of roads. The navigation device 90 identifies the longitude and latitude of the current position of the controlled vehicle upon receipt of a command from the vehicle control ECU 100 and outputs link data and node data of curving roads existing in a predetermined distance ahead the controlled vehicle from the current position of the controlled vehicle.

The vehicle control ECU 100 has a microcomputer including a CPU, a ROM, a RAM, an I/O interface and a bus connecting those components, all of which are well-known. When there is a curving road ahead the controlled vehicle in the traveling direction, the vehicle control ECU 100 sets a target speed at which the controlled vehicle travels the curving road and calculates target acceleration or deceleration rate for accelerating or decelerating the controlled vehicle to the target speed thus set. The ECU 100 executes acceleration or deceleration control such that acceleration or deceleration rate of the controlled vehicle equals the target acceleration or deceleration rate based on the result of a comparison between the speed of the controlled vehicle and the target speed.

Figure 2:
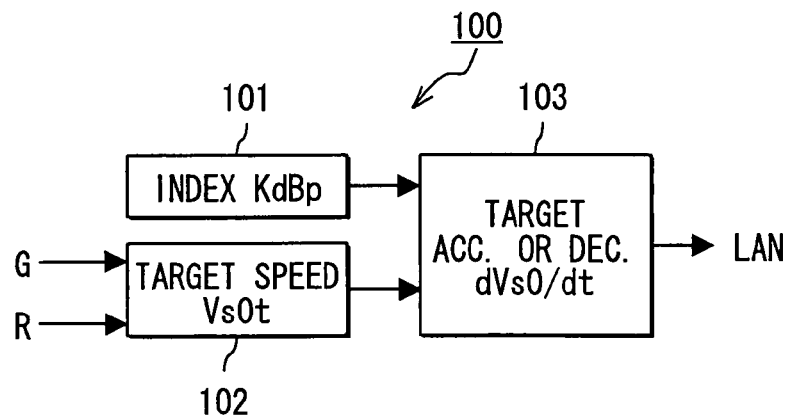
FIG. 2 is a functional block diagram of a vehicle control ECU according to the first embodiment of the invention.

The vehicle control ECU 100 includes, as shown in FIG. 2, an evaluation index calculation unit 101 for calculating a present value KdBp of a distance decreasing/increasing state evaluation index, a target speed setting unit 102 for setting a target speed for the controlled vehicle, and a target acceleration/deceleration calculation unit 103 for calculating target acceleration or deceleration for the controlled vehicle.

The evaluation index calculation unit 101 calculates, by using the following expression (1), a present index value KdBp between the controlled vehicle and the road appurtenance based on the distance (represented by D) between the road appurtenance that is provided around a curving road in front of the controlled vehicle (that is, the distance to the point at which the controlled vehicle deviate from exit the curving road) and the speed of the controlled vehicle (represented by Vs0). The index value KdBp is for evaluating a state in which the distance from the controlled vehicle to the road appurtenance decreases or increases. In the following the expression, |−2×Vs0| represents the absolute value of (−2×V20).

$$KdBp = 10 \times \log\{|-2 \times Vs0|/(D^3 \times 5 \times 10^{-8})\} \quad (1)$$

An object appurtenant to a road such as a traffic lane line, pole, guardrail, curbstone, reflecting plate or delineator is provided at a boundary of a curving road or in the neighborhood of the same. Therefore, the distance D to the point where the controlled vehicle will deviates from the curving road can be acquired from the distance to such a road appurtenance. The distance D between the road appurtenance and the controlled vehicle may alternatively be acquired using results of detection by the GSP receiver and link data and node data among the road map data.

The evaluation index KdB will now be described. When there is a curving road in the traveling direction of a controlled vehicle, a driver of the controlled vehicle normally determines that the controlled vehicle is approaching to a road appurtenance (distance is decreasing), which is provided at a road boundary of the curving road or in the neighborhood of the same, or that the controlled vehicle is leaving from road appurtenance (distance is increasing) from changes in a visually perceived surface area of the road appurtenance. Then, the driver adjusts the acceleration or deceleration of the controlled vehicle by operating the accelerator or brake. Therefore, an index representing changes in the visually perceived surface area of the road appurtenance to serve as a reference for the determination of the driver is obtained as the evaluation index KdB.

A specific method of calculating the evaluation index KdB will now be described. It is assumed that the actual height, width and surface area of a road appurtenance are represented by Ho, Wo, and So (=Ho×Wo), respectively; the height, width, and surface area of an image of the road appurtenance projected on the eyes (retinas) of the driver of the controlled vehicle are represented by H, W, and S (=H×W), respectively; the distance from the eyes (crystal lenses) of the driver to the road appurtenance is represented by D; and the focal length of the driver's eyes is represented by F. Then, an apparent surface area S of the road appurtenance is given by the following the expression (2).

$$S = W \times H = Ho \times Wo \times (F/D)^2 \quad (2)$$

Therefore, a time rate of change dS/dt of the apparent surface area S of the road appurtenance projected on the retinas of the driver is given by the following the expression (3).

$$dS/dt = d(W \times H)/dt \propto d(F/D)^2/dt \propto d(1/D^2)/dt \quad (3)$$

When the expression (3) is partially differentiated by the distance D, the time rate of change dS/dt of the apparent surface area S of the road appurtenance can be expressed by the following expression (4) which gives a time rate of change K of the surface area of the road appurtenance.

$$dS/dt \propto d(1/D^2)/dt = \{d(1/D^2)\}/dD \times (dD/dt) = (-2/D^3) \times Vr = K \quad (4)$$

As apparent from the above, the time rate of change K of the surface area of a road appurtenance can be calculated from the distance D between the road appurtenance and a relative speed Vr which is a time rate of change of the distance D. The speed is equal to the speed Vs0 of the controlled vehicle because the road appurtenance is a fixed object).

The time rate of change K of the surface area of a road appurtenance represents the time rate of change dS/dt of the apparent surface area S of the road appurtenance. Therefore, the rate of change K is equal to a time rate of change of the size per unit time of an image of the road appurtenance photographed by the photographic unit such as the CCD camera 60a. The time rate of change K of the surface area of the road appurtenance may therefore be calculated from the time rate of change per unit time of an image of the road appurtenance photographed by the CCD camera 60a.

The time rate of change K of the surface area of a road appurtenance undergoes a significant change on the order of magnitude of $10^{16}$, for example, when the distance D is in the range from 1 to 100 m. For this reason, the time rate of change K is represented in decibels. Representation in decibels is based on an assumption that a minimum surface area change that a driver can recognize is a time rate of change $K_0$ of the surface area of a road appurtenance when the controlled vehicle approaches the road appurtenance that is located 100 m ahead the vehicle at a relative speed Vr=−0.1 km/h, the minimum surface area change being defined to have a value of 0[dB].

$$K_0 = (-2/D^3) \times Vr = (-2/100^3) \times (-0.1/3.6) \approx 5 \times 10^{-8} \quad (5)$$

Assuming that a time rate of change $K_0 = 5 \times 10^{-8}$ of the surface area of a road appurtenance is 0 [dB] when represented in decibels, it is defined that the index given by the following expression (6) serves as the evaluation index KdB. The evaluation index KdB assumes a positive value when the distance of the controlled vehicle from a road appurtenance decreases and assumes a negative value when the distance increases. The relative speed Vr in the expression (6) is equal to the speed Vs0 of the controlled vehicle because an appurtenance to a road is a fixed object. Therefore, the speed Vs0 of the controlled vehicle is substituted for the relative speed Vr in the expression (6) to obtain the expression (1).

$$KdB = 10 \times \log\{|K/(5 \times 10^{-8})|\} = 10 \times \log\{(|-2 \times Vr|/(D^3 \times 5 \times 10^{-8})\} \quad (6)$$

The target speed setting unit 102 sets a target speed at which the controlled vehicle is to travel on a curving road in front of the same from the lateral G of the controlled vehicle and the radius of curvature R of the curving road. The radius of curvature R of a curving road will now be described with reference to FIG. 3. In a common road, easement curve sections are provided before and after a circular curve section. For example, a straight section is followed by a section having an easement (clothoidal or third-order parabolic) curve, a circular curve section, another easement curve section, and another straight section. In the present embodiment, the description will address the radius of curvature R of a curving road formed by a circular curve section only as shown in FIG. 3 for simplicity.

When a curving road exists in front of the controlled vehicle, the radius of curvature R of the curving road is the distance from a center 0 of a circular curve of the curving road to the centerline of the traffic lane of the curving road on which the controlled vehicle is traveling. The radius of curvature R may be acquired based on link data and node data forming road map data output from the navigation device 90. The radius of curvature R of the curving road may alternatively be estimated from information on an appurtenance to the road such as a traffic lane line, pole, guardrail, curbstone 4, reflecting plate or delineator output from the radar 70 or the image recognition processor 60b. In the case of estimation from the information on a traffic lane line, pole, guardrail, curbstone 4, reflecting plate or delineator, an approximate curve may be obtained from the information, and the radius of curvature R of the approximate curve may be obtained.

Figure 3:
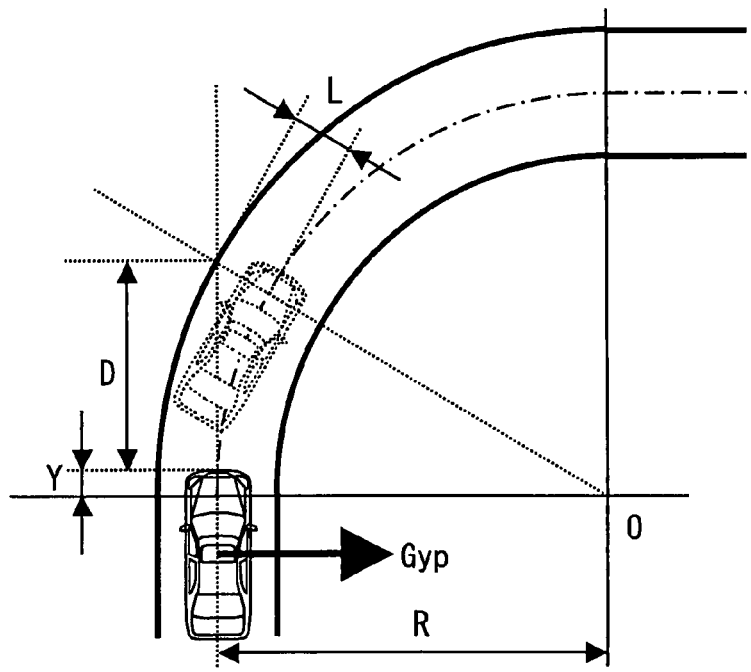
FIG. 3 is an illustration of the first embodiment of the invention, showing a radius of curvature of a curving road, a distance between an object appurtenant to the road and a front end part of a controlled vehicle, a distance between the front end part of the controlled vehicle and a center axis of front wheels of the controlled vehicle, a distance L between the center of the width of the controlled vehicle on the center axis of the front wheels of the controlled vehicle and the object appurtenant to the road, and a present value Gyp of the lateral acceleration.

It is now assumed that, as shown in FIG. 3, D represents the distance between the controlled vehicle and an appurtenance to the road such as a traffic lane line, pole, guardrail, curbstone 4, reflecting plate or delineator located straight ahead of the controlled vehicle, that is, on an imaginary line extending from the controlled vehicle in the traveling direction thereof; Y represents the distance between the front end part of the controlled vehicle and the center axis of the front wheels of the controlled vehicle; and L represents the distance between the center of the width of the controlled vehicle on the center axis of the front wheels and the road appurtenance. Then, the following the expression holds true.

$$(D+Y)^2 + R^2 = (R+L)^2 \qquad (7)$$

Therefore, the radius of curvature R of the curving road may be identified by calculating the expression (8) that is a rearrangement of the expression (7).

$$R = \{(D+Y)^2 - L^2\}/2 \times L \qquad (8)$$

When the controlled vehicle is traveling on the curving road and the vehicle is about to enter the curving road, the target speed setting unit 102 sets a target speed Vs0t by calculating the following the expression (9) from a present value Gyp of the lateral G acting in a direction lateral to the controlled vehicle and the radius of curvature of the curving road.

$$Vs0t = -(R \times Gyp)^{1/2} \qquad (9)$$

The target acceleration/deceleration calculation unit 103 compares the present speed Vs0 and the target speed Vs0t of the controlled vehicle. When the comparison result indicates that the difference between the present speed Vs0 and the target speed Vs0t of the controlled vehicle is smaller than a predetermined speed difference, the calculation unit 103 calculates target acceleration or deceleration to maintain the present speed Vs0 of the controlled vehicle.

When the speed difference is larger than the predetermined speed difference, the unit 103 obtains target acceleration or deceleration rate dVs0/dt at which the controlled vehicle is to be accelerated or decelerated to reach the target speed Vs0t by calculating the expression 10 using a present value KdBp of the evaluation index, the distance D between the road appurtenance and the controlled vehicle, the speed Vs0 of the controlled vehicle, and the target speed Vs0t.

$$dVs0/dt = \text{gain} \times 7.5 \times D^2 \times 10^{\{(|KdBp|/10)-8\}} \times Vs0 \qquad (10)$$

A method of calculating the target acceleration/deceleration rate dVs0/dt will now be described. First, the expression (1) is changed to derive the following the expressions (11) and (12).

$$10^{(|KdBp|/10)} = |-2 \times Vs0|/(D^3 \times 5 \times 10^{-8}) \qquad (11)$$

$$|-Vs0| = (D^3 \times 5 \times 10^{-8}/2) \times 10^{(|KdBp|/10)}$$
$$= 2.5 \times D^3 \times 10^{\{(|KdB|/10)-8\}} \qquad (12)$$

The following the expression (13) is obtained by time-differentiating the expression (12).

$$(dVs0/dD) \times (dD/dt) = 7.5 \times D^2 \times 10^{\{(|KdBp|/10)-8\}} \times Vs0 \qquad (13)$$

The expression (13) represents a target value for acceleration or deceleration of the controlled vehicle to be achieved to maintain the present value KdBp of the evaluation index. The expression (10) is obtained by multiplying the expression (13) by a variable "gain". The variable "gain" is given by the expression (14).

$$\text{gain} = Gxt/(7.5 \times D^2 \times 10^{\{(|KdBp|/10)-8\}} \times Vs0) \qquad (14)$$

Gxt in the expression (14) is obtained by calculating the expression (15) from the present speed Vs0 and the target speed Vs0t of the controlled vehicle. The symbol Δt represents a divisor for converting the difference between the present speed Vs0 and the target speed Vs0t of the controlled vehicle into target deceleration Gxt of the controlled vehicle, and the divisor is appropriately set.

$$Gxt = (Vs0 - Vs0t)/\Delta t \qquad (15)$$

The target acceleration/deceleration calculation unit 103 outputs the target acceleration or deceleration rate dVs0/dt obtained by calculating the expression (10) to the in-vehicle LAN.

Figure 4:
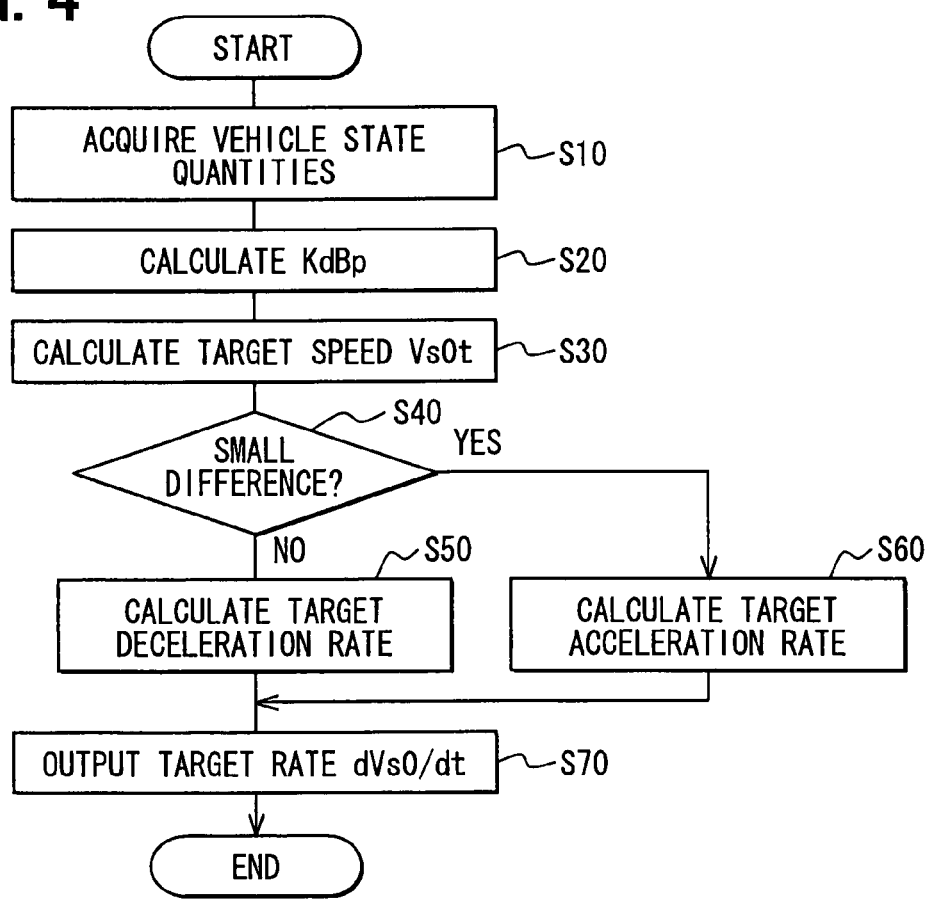
FIG. 4 is a flow chart showing a flow of control processes performed by the vehicle control ECU according to the first embodiment of the invention.

Control processes executed by the vehicle control ECU 100 will now be described referring to FIG. 4. First, quantities representing vehicle states such as the speed Vs0 of the controlled vehicle are acquired at step S10. Step S20 identifies the distance D between the controlled vehicle and an appurtenance to a road located on an imaginary line extending from the controlled vehicle in the traveling direction thereof, and a present value KdBp of the evaluation index is calculated using the distance D. At step S30, a target speed Vs0t at which the controlled vehicle is to travel on the curving road in front of the same is calculated or set.

At step S40, the present speed Vs0 of the controlled vehicle is compared with the target speed Vs0t set at step S30 to check whether the difference between the present speed Vs0 and the target speed Vs0t of the controlled vehicle is smaller than a predetermined speed difference or not. When the determination is positive, the process proceeds to step S60. When the determination is negative, the process proceeds to step S50.

When the present speed Vs0 of the controlled vehicle is higher than the target speed Vs0t, target deceleration rate dVs0/dt at which the controlled vehicle is to be decelerated to reach the target vehicle speed Vs0t is calculated at step S50. When the present speed Vs0 of the controlled vehicle is lower than the target speed Vs0t, target acceleration rate dVs0/dt at which the controlled vehicle is to be accelerated to reach the target vehicle speed Vs0t is calculated.

At step S60, target acceleration or deceleration rate to maintain the present speed Vs0 of the controlled vehicle is calculated. At step S70, the target acceleration or deceleration dVs0/dt calculated at step S50 or S60 is output to the in-vehicle LAN. Each of the above steps is thereafter repeated at predetermined timing.

Thus, when the present speed Vs0 of the controlled vehicle is higher than the target speed Vs0t, deceleration control is executed such that deceleration occurring at the controlled vehicle equals the target deceleration rate dVs0/dt. When the present speed Vs0 of the controlled vehicle is lower than the target speed Vs0t, acceleration control is executed such that acceleration occurring at the controlled vehicle equals the target acceleration rate dVs0/dt. As a result, the controlled vehicle can be decelerated or accelerated with reference to the target speed Vs0t at which the controlled vehicle is to travel on the curving road in front of the same.

When the difference between the present speed Vs0 and the target speed Vs0t of the controlled vehicle is smaller than a predetermined speed difference, speed control is executed to maintain the present speed Vs0 of the controlled vehicle.

Thus, driving operations of the driver can be assisted with the vehicle maintained at a passable speed when the vehicle travels on the curving road.

As thus described, the driving support system sets a target speed $Vs0t$ for traveling on a curving road based on a present value $Gyp$ of lateral G acting on the controlled vehicle when the controlled vehicle travels on the curving road and the radius of curvature R of the curving road. Since the present value $Gyp$ of the lateral G is lateral acceleration actually acting when the controlled vehicle travels on the curving road, it is related to actual road conditions and the state of the controlled vehicle. Therefore, vehicle speed control can be executed according to the actual road conditions and the state of the controlled vehicle by setting the target speed $Vs0t$ using the present value $Gyp$ of lateral G acting when the controlled vehicle travels on the curving road and by controlling acceleration and deceleration based on the result of a comparison between the target speed $Vs0t$ thus set and the speed $Vs0$ of the controlled vehicle.

The first embodiment may be modified as follows.

As a first modification, for example, when a driver keeps the steering wheel at a constant steering angle, deceleration control may be executed with the target speed $Vs0t$ at zero (0). As a second modification, the driving support system may execute only deceleration control or acceleration control.

Second Embodiment

The second embodiment is different from the first embodiment in that the driving support system executes deceleration control to avoid a collision between a controlled vehicle and an obstacle present on a road in front of the vehicle in the traveling direction thereof or to decelerate the controlled vehicle in passing the obstacle.

Figure 5:
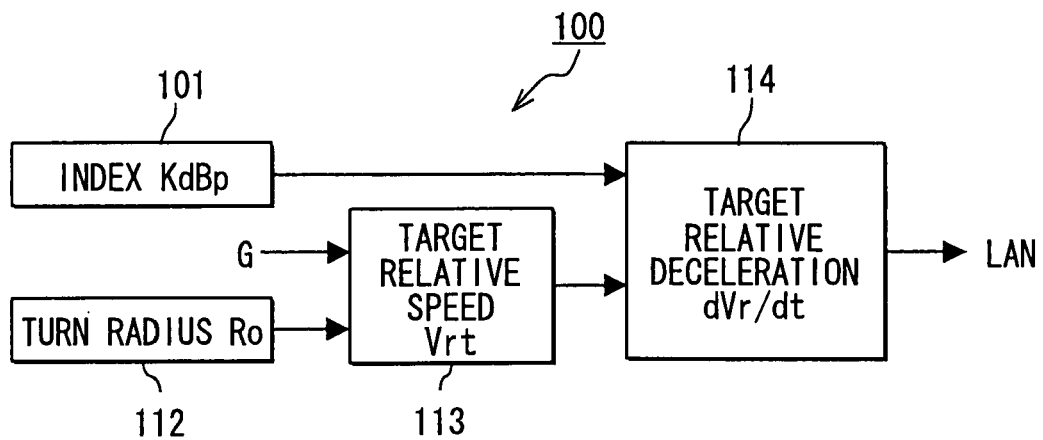
FIG. 5 shows functional blocks of a vehicle control ECU according to a second embodiment of the invention.

As shown in FIG. 5, the vehicle control ECU 100 includes, in addition to the evaluation index calculation unit 101, a turning radius calculation unit 112, a target relative speed calculation unit 113 and a target relative deceleration calculation unit 114. The evaluation index calculation unit 101 calculates the present value $KdBp$ of the evaluation index. The turning radius calculation unit 112 calculates a turning radius Ro of the controlled vehicle required for the controlled vehicle to avoid a collision with an obstacle (or to pass the obstacle). The target relative speed calculation unit 113 calculates a target relative speed $Vrt$ between the obstacle and the controlled vehicle from a present value $Gyp$ of lateral G which will act in a direction lateral to the controlled vehicle when the controlled vehicle avoids a collision with the obstacle (or when the vehicle passes the obstacle). The target relative deceleration calculation unit 114 for calculating a target relative deceleration rate $dVr/dt$ at which the controlled vehicle is to be decelerated to reach the target relative speed from the present value $KdBp$ of the evaluation index and the target relative speed $Vrt$.

When an obstacle such as a leading vehicle exists on the road in an overlapping relationship with a future locus of a projected surface of the controlled vehicle, the evaluation index calculation unit 101 calculates the present value $KdBp$ of the index for evaluating a state of decrease or increase in the distance between the obstacle and the controlled vehicle using the following expression (16) from the distance D between the controlled vehicle and the obstacle such as the leading vehicle existing in front of the controlled vehicle and a relative speed $Vr$ between the controlled vehicle and the obstacle. In the following the expression, $|-2 \times Vr|$ represents the absolute value of $(-2 \times Vr)$. The relative speed $Vr$ has a negative sign (−) when the controlled vehicle approaches the obstacle and a positive sign (+) when the leading vehicle (obstacle) moves away from the controlled vehicle.

$$KdBp = 10 \times \log\{|-2 \times Vr|/(D^3 \times 5 \times 10^{-8})\} \quad (16)$$

Referring to the future locus of a projected surface of the controlled vehicle, a future locus that the controlled vehicle will draw when it travels with the present traveling state of the same kept unchanged is estimated based on information on the traveling state of the controlled vehicle. For example, when the controlled vehicle is traveling straight, the future locus is estimated on an assumption that the vehicle travels with the straight traveling state kept unchanged. The future locus of a projected surface of the controlled vehicle estimated in the present embodiment is defined by the lateral width (represented by $Ws$) and the height (represented by $Hs$) of the controlled vehicle. That is, the future locus in three dimensions, i.e., the traveling direction of the controlled vehicle, the direction of the lateral width of the vehicle, and the direction of the height of the vehicle, is estimated.

When there is an obstacle on the road which overlaps a future locus of a projected surface of the controlled vehicle thus estimated, the distance D between the obstacle and the controlled vehicle is acquired. As a result, the distance of the obstacle which is highly likely to collide with the controlled vehicle can be acquired while excluding any obstacle in a position out of the future locus of the projected surface of the controlled vehicle from the subject of distance acquisition because such an obstacle is less likely to collide with the controlled vehicle. When there is a plurality of obstacles overlapping the future locus of the projected surface of the controlled vehicle, the distance of the obstacle located closest to the controlled vehicle is acquired.

The future locus of a projected surface of the controlled vehicle may be estimated based on a minimum ground clearance $Hg$ of the controlled vehicle. For example, cat's eyes provided on a road along the centerline thereof must be excluded from the subject of distance acquisition because they are objects forming no obstacle to the controlled vehicle. It is therefore possible to exclude objects forming no obstacle to the control vehicle from the subject of distance acquisition by estimating the future locus of a projected surface of the controlled vehicle which is based on the minimum road clearance of the vehicle and which excludes a part $Sg$ under the floor of the vehicle.

When there is a leading vehicle as an obstacle in the traveling direction of the controlled vehicle, the driver of the controlled vehicle normally determines that the distance of the controlled vehicle from the leading vehicle is decreasing or that the distance from the leading vehicle is being increased from a change in a visually perceived surface area of the leading vehicle. The driver then adjusts acceleration or deceleration of the controlled vehicle by operating the accelerator or brake. Therefore, the index representing a change in such a visually perceived surface area of the leading vehicle serving as a reference for determination by the driver is obtained as the evaluation index $KdB$. A specific method of calculating the evaluation index $KdB$ will be described below.

It is assumed that the actual height, width and surface area of the leading vehicle are represented by $Ho$, $Wo$, and $So$ ($=Ho \times Wo$), respectively; the height, width, and surface area of an image of the leading vehicle projected on the eyes (retinas) of the driver of the controlled vehicle are represented by H, W, and S ($=H \times W$), respectively; the distance from the eyes (crystal lenses) of the driver to the leading vehicle is represented by D; and the focal length of the driver's eyes is represented by F. Then, an apparent surface area S of the leading vehicle is given by the following expression (17).

$$S = W \times H = Ho \times Wo \times (F/D)^2 \quad (17)$$

Therefore, a time rate of change dS/dt of the apparent surface area S of the leading vehicle projected on the retinas of the driver is given by the following expression (18).

$$dS/dt = d(W \times H)/dt \propto d(F/D)^2/dt \propto d(1/D^2)/dt \quad (18)$$

When the expression (18) is partially differentiated by the distance D, the time rate of change dS/dt of the apparent surface area S of the leading vehicle can be expressed by the following expression (19) which gives a time rate of change K of the surface area of the leading vehicle.

$$\frac{dS}{dt} \propto \frac{d(1/D^2)}{dt} = \left\{\frac{d(1/D^2)}{dD}\right\} \times \left(\frac{dD}{dt}\right) \quad (19)$$
$$= (-2/D^3) \times Vr$$
$$= K$$

As apparent from the above, the time rate of change K of the surface area of the leading vehicle can be calculated from the distance D between the leading vehicle and the controlled vehicle, and the relative speed Vr which is a time rate of change of the distance D.

The time rate of change K of the surface area of a leading vehicle represents the time rate of change dS/dt of the apparent surface area S of the leading vehicle. Therefore, the rate of change K is equal to a time rate of change of the size per unit time of an image of the leading vehicle photographed by the photographic unit such as the CCD camera 60a. The time rate of change K of the surface area of the leading vehicle may therefore be calculated from the time rate of change per unit time of an image of the leading vehicle photographed by the CCD camera 60a.

The time rate of change K of the surface area of the leading vehicle undergoes a significant change on the order of magnitude of $10^{16}$, for example, when the distance D is in the range from 1 to 100 m. For this reason, the time rate of change K is represented in decibels. Representation in decibels is based on an assumption that a minimum surface area change that a driver can recognize is a time rate of change $K_0$ of the surface area of a leading vehicle when the controlled vehicle approaches the leading vehicle that is located 100 m ahead the controlled vehicle at a relative speed Vr=−0.1 km/h, the minimum surface area change being defined to have a value of 0[dB]. The time rate of change $K_0$ is given by the expression 20.

$$K_0 = (-2/D^3) \times Vr = (-2/100^3) \times (-0.1/3.6) \approx 5 \times 10^{-8} \quad (20)$$

By assuming that a time rate of change $K_0 = 5 \times 10^{-8}$ of the surface area of the leading vehicle is 0 [dB] when represented in decibels, it is defined that the index given by the following expression (21) serves as the evaluation index KdB. The evaluation index KdB assumes a positive value when the distance of the controlled vehicle from the leading vehicle decreases and assumes a negative value when the distance increases.

$$KdB = 10 \times \log\{|K/(5 \times 10^{-8})|\} \quad (21)$$
$$= 10 \times \log\{(|-2 \times Vr|/(D^3 \times 5 \times 10^{-8})\}$$

Figure 6:
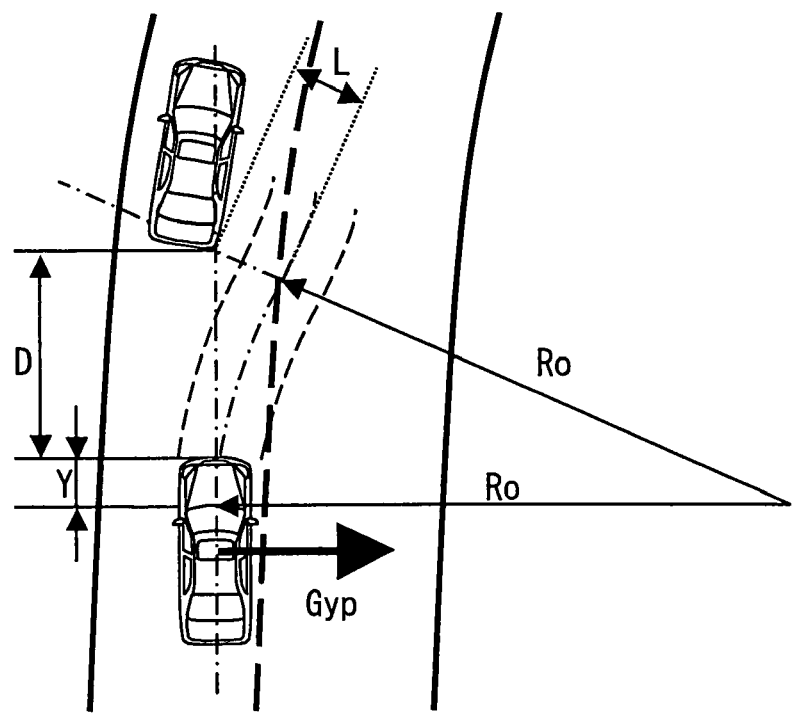
FIG. 6 is an illustration for explaining a turning radius Ro required for a controlled vehicle to avoid a collision with a leading vehicle.

The turning radius calculation unit 112 calculates the turning radius Ro required for the controlled vehicle to avoid a collision with the obstacle (or to pass the obstacle) based on the distance D between the obstacle and the controlled vehicle. For example, when the leading vehicle as an obstacle exists in front of the controlled vehicle at the distance D as shown in FIG. 6, the following expression (22) holds true where Y represents the distance between the front end part of the controlled vehicle and the center axis of the front wheels of the controlled vehicle; and L represents the distance between the center of the width of the controlled vehicle and a right rear end part of the leading vehicle.

$$(D+Y)^2 + Ro^2 = (Ro+L)^2 \quad (22)$$

Therefore, the turning radius Ro is determined by calculating the following expression (23) which can be obtained by rearranging the expression (22).

$$Ro = \{(D+Y)^2 - L^2\}/2 \times L \quad (23)$$

The target relative speed calculation unit 113 calculates the target relative speed Vrt between the obstacle and the controlled vehicle by calculating the expression (24) from the turning radius Ro and the current value Gyp of lateral G which will act in a direction lateral to the controlled vehicle when the controlled vehicle avoids a collision with the obstacle (or when the vehicle passes the obstacle).

$$Vrt = -(Ro \times Gyp)^{1/2} \quad (24)$$

The target relative deceleration calculation unit 114 obtains target relative deceleration rate dVr/dt at which the controlled vehicle is to be decelerated to reach the target relative speed Vrt by calculating the expression (25) using the distance D between the obstacle and the controlled vehicle, the present value Vrp of the relative speed, and the present value KdBp of the evaluation index.

$$dVr/dt = gain \times 7.5 \times D^2 \times 10^{\{(|KdBp|/10)-8\}} \times Vrp \quad (25)$$

The target acceleration/deceleration rate dVr/dt is calculated using a method similar to that described in the first embodiment. The variable "gain" is given by the expression (26).

$$gain = Gxt/(7.5 \times D^2 \times 10^{\{(|KdBp|/10)-8\}} \times Vrp) \quad (26)$$

Gxt in the expression (26) is obtained by calculating the expression (27) from the present value Vrp of the relative speed and the target relative speed Vrt. The symbol Δt represents a divisor for converting the difference between the present value Vrp of the relative speed and the target relative speed Vrt into target deceleration Gxt of the controlled vehicle, and the divisor is appropriately set.

$$Gxt = (Vrp - Vrt)/\Delta t \quad (27)$$

The target relative deceleration calculation unit 114 outputs the target relative deceleration rate dVr/dt obtained by calculating the expression (27) to the in-vehicle LAN.

Figure 7:
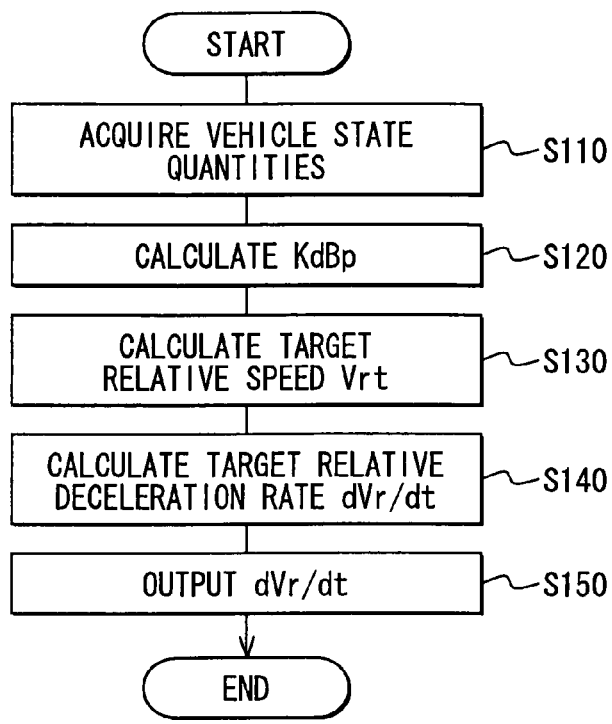
FIG. 7 is a flow chart showing a flow of control processes performed by the vehicle control ECU according to the second embodiment of the invention.

Control processes executed by the vehicle control ECU 100 will now be described with reference to FIG. 7. First, quantities representing vehicle states such as the speed Vs0 of the controlled vehicle are acquired at step S110. When there is an obstacle on the road in an overlapping relationship with a future locus of a projected surface of the controlled vehicle, step S120 acquires the distance D between the obstacle and the controlled vehicle and calculates the present value KdBp of the evaluation index using the distance D thus acquired. At step S130, the target relative speed Vrt between the obstacle and the controlled vehicle is calculated.

At step S140, target relative deceleration rate dVr/dt at which the controlled vehicle is to be decelerated to reach the target relative speed Vrt is calculated. At step S150, the target relative deceleration rate dVr/dt obtained at step S140 is output to the in-vehicle LAN. Thereafter, each of the above steps is repeated at predetermined timing.

As thus described, the driving support system of the second embodiment acquires the present value Gyp of lateral acceleration which will occur in a direction lateral to the controlled vehicle when the controlled vehicle avoids a collision with an obstacle or passes the obstacle. Then, the system calculates a target relative speed Vrt from the present value Gyp of lateral acceleration thus acquired and a turning radius Ro of the controlled vehicle required for the controlled vehicle to avoid a collision with the obstacle or to pass the obstacle.

The present value Gyp of lateral acceleration in a direction lateral to the controlled vehicle is lateral acceleration which actually occurs in a direction lateral to the controlled vehicle when the controlled vehicle avoids a collision with an obstacle or passes the obstacle. Therefore, it is related to actual road conditions and the state of the controlled vehicle. Therefore, vehicle speed control can be executed according to the actual road conditions and the state of the controlled vehicle by calculating the target relative speed Vrt using the present value Gyp of the lateral acceleration and exercising deceleration control based on the target relative deceleration rate dVr/dt for decelerating the controlled vehicle to the target relative speed Vrt.

Third Embodiment

The third embodiment is similar to the first and second embodiments in that, operations similar to those of the driving support system of the first embodiment are executed when there is no obstacle on a curving road, and deceleration control is executed to avoid a collision with an obstacle when there is the obstacle on the curving road.

Figure 8:
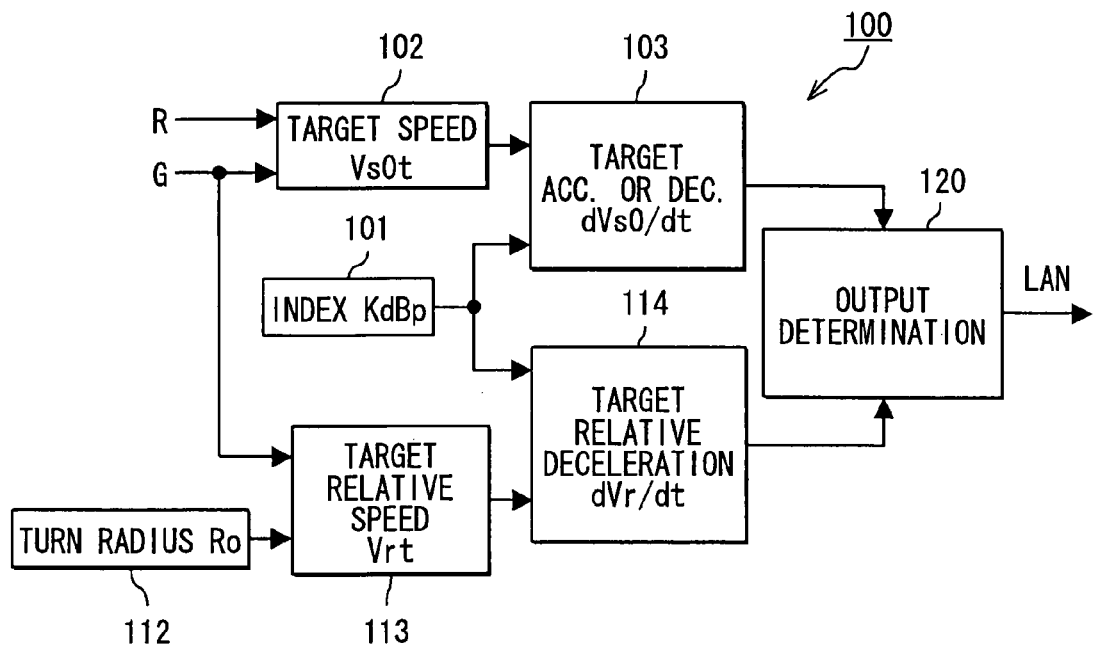
FIG. 8 shows functional blocks of a vehicle control ECU according to a third embodiment of the invention.

As shown in FIG. 8, the vehicle control ECU 100 according to the third embodiment is different in that an output determination unit 120 is provided.

When an obstacle such as a leading vehicle exists on a curving road in front of the controlled vehicle in an overlapping relationship with a future locus of a projected surface of the controlled vehicle, the evaluation index calculation unit 101 calculates the present value KdBp of the index for evaluating a state of decrease or increase in the distance between the obstacle and the controlled vehicle using the expression (16) from a distance D between the controlled vehicle and the obstacle such as a leading vehicle and a relative speed Vr between the controlled vehicle and the obstacle. When there is no obstacle on the curving road in an overlapping relationship with the future locus of the projected surface of the controlled vehicle, the unit 101 calculates a present value KdBp of the evaluation index with respect to an appurtenance to the road using the expression (1) from the distance D between the road appurtenance and the controlled vehicle and the speed Vs0 of the controlled vehicle.

The output determination unit 120 outputs a target relative deceleration rate dVr/dt calculated by the target relative deceleration calculation unit 114 when there is an obstacle on the road to the in-vehicle LAN. When there is no obstacle on the road, target acceleration or deceleration rate dVs0/dt calculated by the target acceleration/deceleration calculation unit 103 is output to the in-vehicle LAN.

Figure 9:
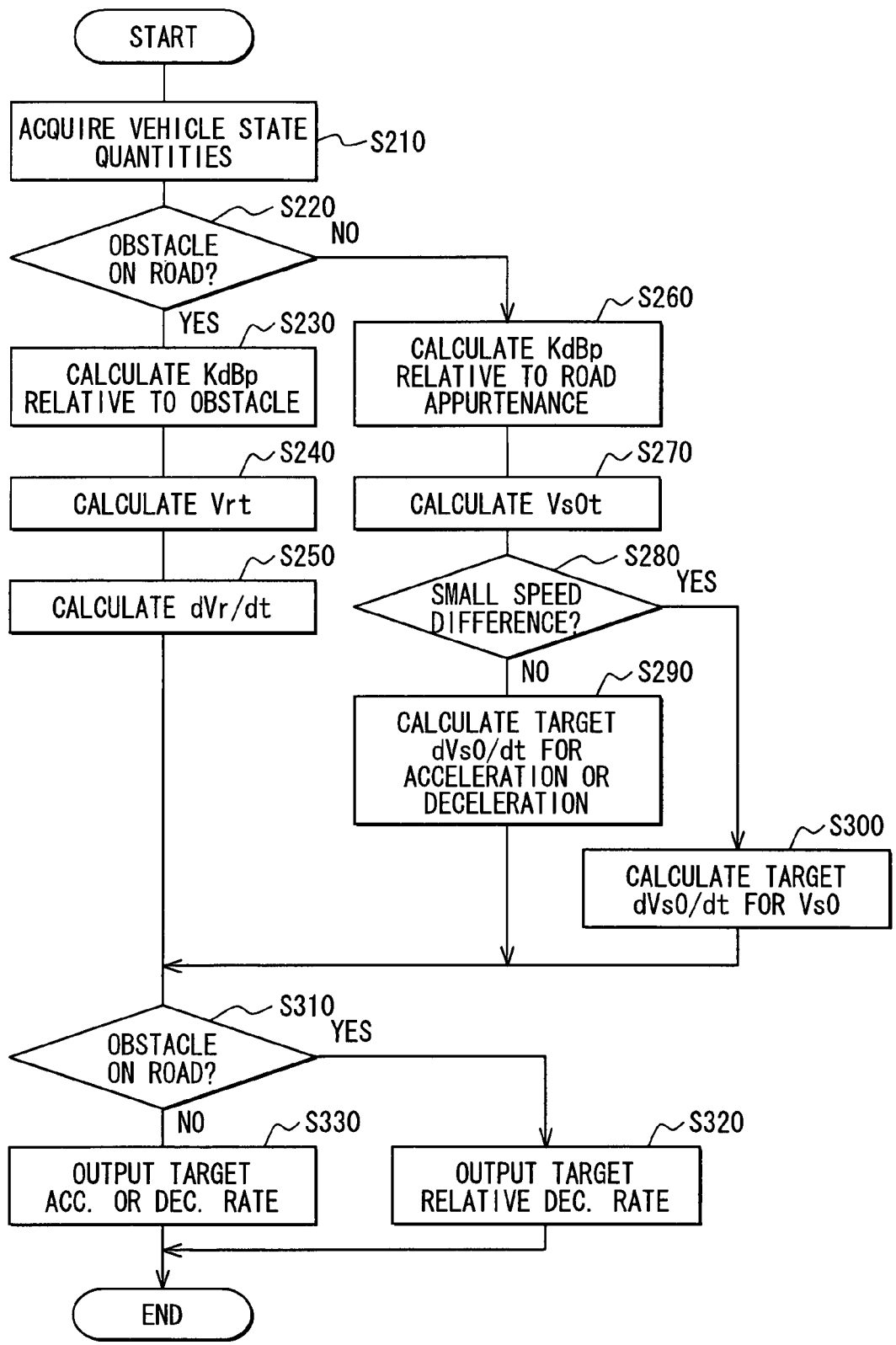
FIG. 9 is a flow chart showing a flow of control processes performed by the vehicle control ECU according to the third embodiment of the invention.

Next, control processes executed by the vehicle control ECU 100 will be described with reference to FIG. 9. First, quantities representing vehicle states such as the speed Vs0 of the controlled vehicle are acquired at step S210. At step S220, it is checked whether there is an obstacle on a road in an overlapping relationship with the future locus of the projected surface of the controlled vehicle. When the determination is positive, the process proceeds to step S230. When the determination is negative, the process proceeds to step S260.

Step S230 acquires the distance D between the controlled vehicle and the obstacle overlapping the future locus of the projected surface of the controlled vehicle, and the present value KdBp of the index for evaluation of a state of decrease or increase in the distance between the obstacle and the controlled vehicle is calculated using the acquired distance D. At step S240, a target relative speed Vrt between the obstacle and the controlled vehicle is calculated. Step S250 calculates the target relative deceleration rate dVr/dt at which the controlled vehicle is to be decelerated to reach the target relative speed Vrt.

Step S260 calculates the distance D between the controlled vehicle and the road appurtenance located on an imaginary line extending from the controlled vehicle in the traveling direction thereof, and the present value KdBp of the index for evaluating a state of decrease or increase in the distance between the road appurtenance and the vehicle is calculated using the distance D. Step S270 calculates or sets a target speed Vs0t at which the vehicle is to travel on the curving road in front of the same.

At step S280, the present speed Vs0 and the target speed Vs0t of the controlled vehicle are compared with each other to check whether the difference between the present speed Vs0 and the target speed Vs0t of the controlled vehicle is smaller than a predetermined speed difference or not. When the determination is positive (small difference), the process proceeds to step S330. When the determination is negative, the process proceeds to step S290.

At step S290, when the present speed Vs0 of the controlled vehicle is higher than the target speed Vs0t, the target deceleration rate dVs0/dt at which the controlled vehicle is to be decelerated to reach the target vehicle speed Vs0t is calculated. When the present speed Vs0 of the controlled vehicle is lower than the target speed Vs0t, the target acceleration rate dVs0/dt at which the controlled vehicle is to be accelerated to reach the target vehicle speed Vs0t is calculated. At step S300, target acceleration or deceleration for maintaining the present speed Vs0 of the controlled vehicle is calculated.

At step S310, it is checked whether there is an obstacle on the road. When the determination is positive in which case the controlled vehicle must avoid collision with the obstacle and pass by the same, the target relative deceleration rate is output to the in-vehicle LAN at step 320. When the determination is negative, the target acceleration or deceleration rate is output to the in-vehicle LAN at step S330. Thereafter, each of the above steps is repeated at predetermined timing.

Thus, when an obstacle exists on a curving road and the relative speed is higher than the target relative speed, the driving support system executes deceleration control such that relative deceleration caused at the controlled vehicle will equal the target relative deceleration, which makes it possible to avoid a collision with the obstacle. When there is no obstacle on the curving road, acceleration or deceleration control is executed such that acceleration or deceleration caused at the controlled vehicle will equal target acceleration or deceleration based on the result of a comparison between the speed of the controlled vehicle and the target speed of the same. It is therefore possible to decelerate the controlled vehicle to a passable speed at which the vehicle can properly travel on the curving road or to accelerate the controlled vehicle to the passable speed.

The target speed at which the controlled vehicle is to travel on the curving road is set based on lateral acceleration actually occurring when the controlled vehicle travels on the curving road. The target relative speed between the obstacle and the controlled vehicle is lateral acceleration actually occurring in a direction lateral to the controlled vehicle when the controlled vehicle avoids a collision with the obstacle or passes the obstacle. Therefore, they are related to actual road conditions and the state of the controlled vehicle. Thus, the vehicle speed can be controlled according to the actual road conditions and the state of the controlled vehicle by exercising deceleration control or acceleration/deceleration control using lateral acceleration occurring at the controlled vehicle.

Fourth Embodiment

Figure 10:
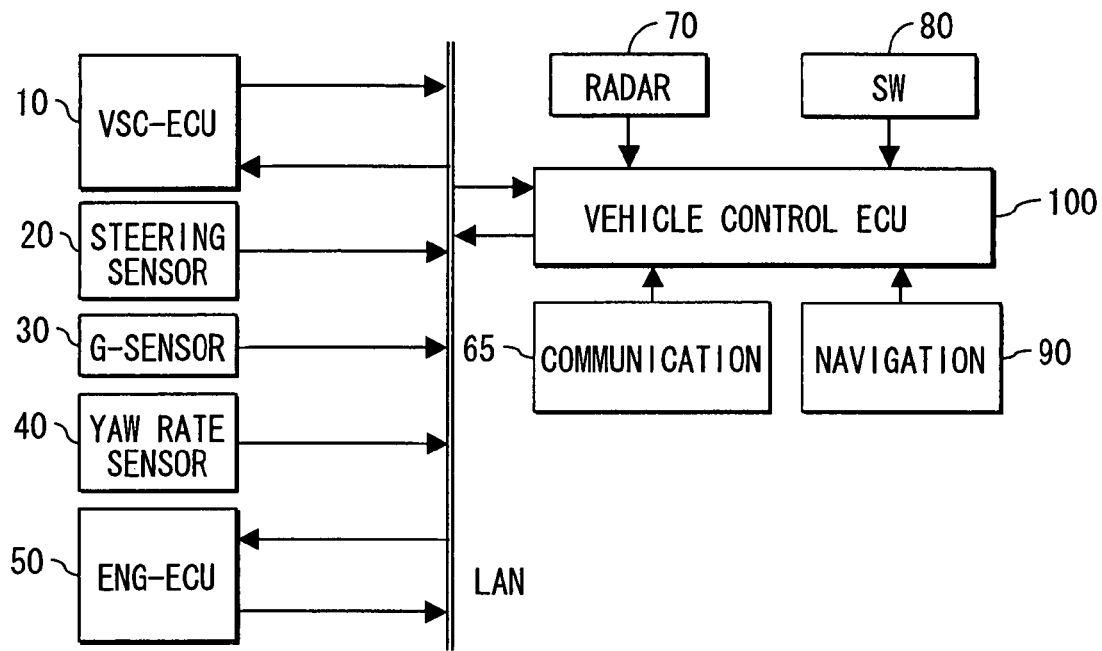
FIG. 10 is a block diagram showing a vehicle control system.

In the fourth embodiment, as shown in FIG. 10, no CCD camera nor image recognition processor unit are provided. Instead, a radio communication device 65 is provided for performing radio communication with a road-side communication device (a road-side infrastructure) provided on a road. When the road in front of the controlled vehicle in the traveling direction has a curve, the device 65 receives curve information indicating the radius of curvature of the curve (Rx), a road surface frictional coefficient μ at the curve, the coordinates (latitudes and longitudes) of entrance and exit points of the curve, the width of the curve, the number of traffic lanes, and the width of each traffic lane, the information being received at a point that is located short of the entrance and exit points of the curve and sufficiently spaced from the entrance. The dedicated short range communication (DSRC) may be used as the radio communication.

The vehicle control ECU 100 determines timing for starting deceleration control when the controlled vehicle enters the curving road using a braking discrimination reference KdBc (KdBct) which will be described later and executes deceleration control to decelerate the controlled vehicle to a target relative speed calculated from target lateral G (Gyt) to be achieved, when the controlled vehicle travels on the curving road. Thus, deceleration control can be achieved so as to reflect the feel of danger that a driver will have when entering a curve.

Figure 11:
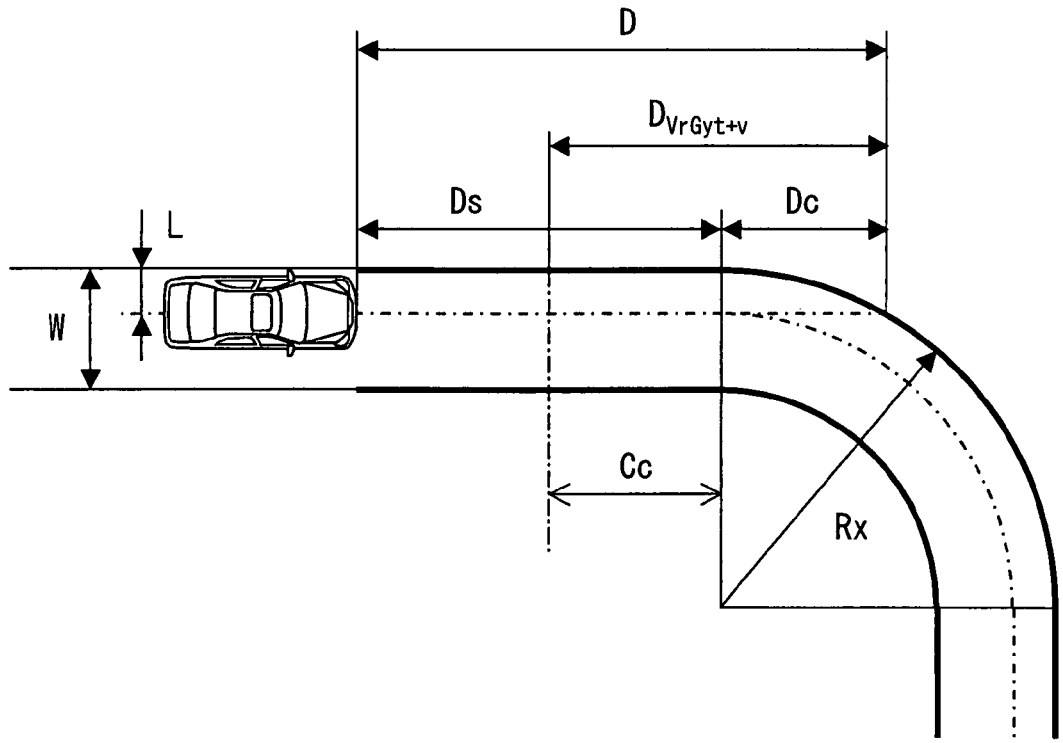
FIG. 11 is an illustration showing a situation in which a controlled vehicle is entering a curving road having a curve radius Rx.

The deceleration control process executed by the vehicle control ECU 100 is described next with reference to FIG. 12 in an exemplary situation in which the controlled vehicle enters a curving road having a curve radius Rxadius Rx as shown in FIG. 11. The deceleration control process is executed when a road located in front of the controlled vehicle in the traveling direction has a curve, and the execution of the process is started upon receipt of curve information through the radio communication device 65.

Figure 12:
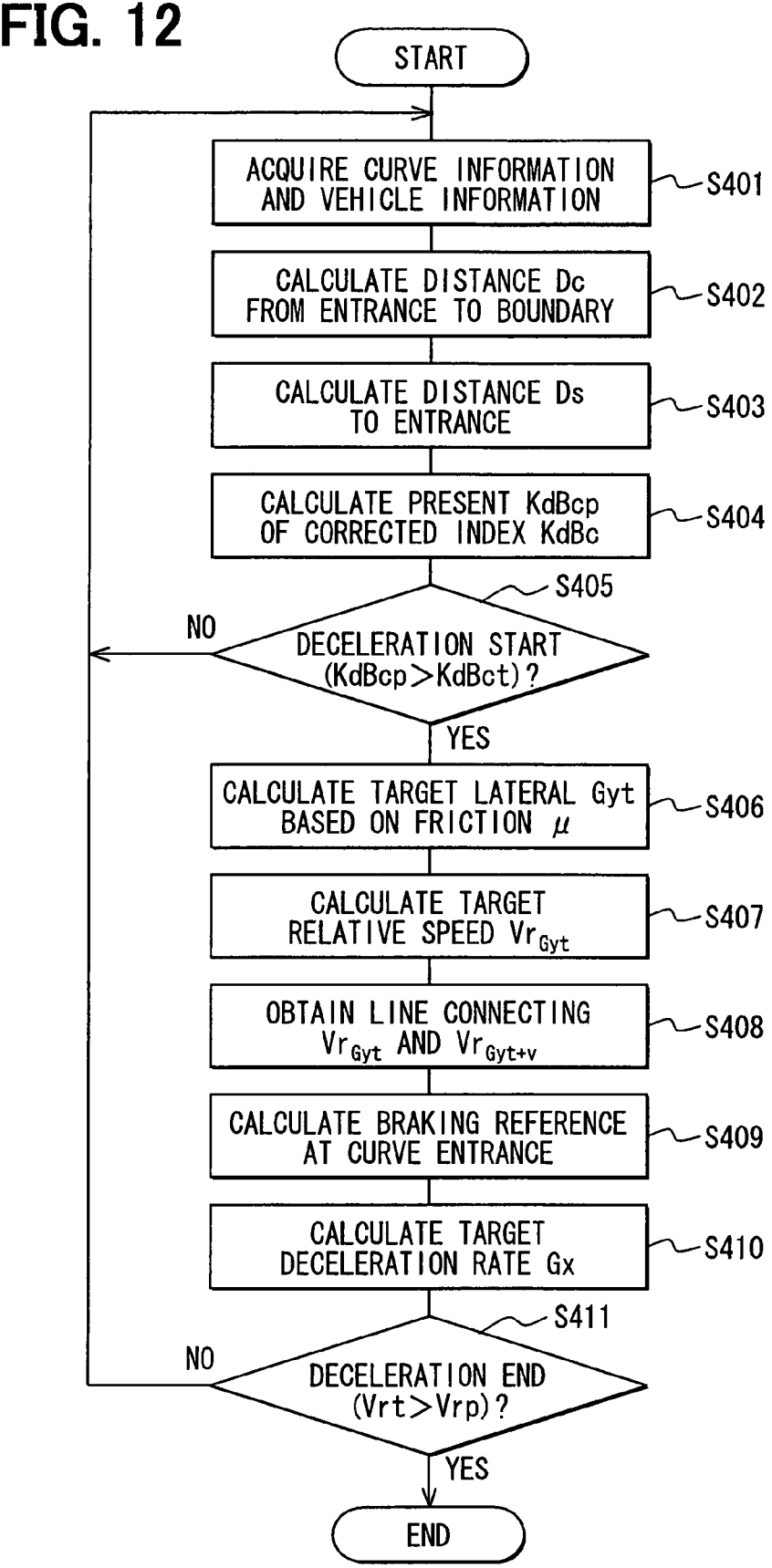
FIG. 12 is a flow chart for explaining a deceleration control process executed by a vehicle control ECU.

First, at step S401 in FIG. 12, curve information and vehicle information are acquired. The curve information includes the curve radius Rx, a road surface frictional coefficient μ at the curve, the coordinates (longitudes and latitudes) of entrance and exit points of the curve, the width of the curve, the number of traffic lanes, and the width of each traffic lane. Vehicle information includes the speed Vs0 of the controlled vehicle and the coordinate (latitude and longitude) of the present position of the controlled vehicle.

At step S402, a distance Dc from the entrance point of the curve in front of the controlled vehicle (the position of an end of a straight section) up to a road boundary on the outside of the curve or a road appurtenance provided in the vicinity of the boundary is calculated using the following expression (28), wherein L represents the lateral position of the center of the controlled vehicle with respect to the traffic lane of the vehicle. The boundary is a point at which the vehicle deviates from the curve if traveling straight ahead without turning left or right at all.

$$Dc=[R^2-(R-L)^2]^{1/2} \quad (28)$$

At step S403, a calculation is performed to obtain the distance (represented by D) from the controlled vehicle up to the road boundary outside the curve in front of the controlled vehicle or the road appurtenance in the vicinity of the boundary. Then, a distance Ds from the controlled vehicle up to the entrance point of the curve in front of the controlled vehicle (straight section ending point) is calculated using the following expression (29).

$$Ds=D-Dc \quad (29)$$

At step S404, a present value KdBcp of a corrected evaluation index KdBc which reflects a relative speed between the controlled vehicle and the road boundary or the road appurtenance is calculated by using the following expression (30). Here, Vrp $(=-Vs0)$ represents the relative speed between the controlled vehicle and the road boundary outside the curve or the road appurtenance provided in the neighborhood of the boundary.

$$KbDcp=10\times\log_{10}\{|-2\times Vrp|/(D^3\times 5\times 10^{-8})\} \quad (30)$$

The corrected evaluation index KdBc is described hereunder. For more detailed description, reference may be made to U.S. patent application Ser. No. 11/805,236 (Japanese patent application No. 2007-7473; IPICS 104304-US). When there is a curve in the traveling direction of a controlled vehicle, the driver of the controlled vehicle normally determines that the controlled vehicle is approaching to or leaving away from the curve based on changes in a visually perceived surface area of a road boundary outside the curve or a road appurtenance provided in the neighborhood of the same. Then, the driver adjusts the acceleration or deceleration of the controlled vehicle by operating the accelerator or brake based on the result of the determination.

Therefore, an index representing changes in the visually perceived surface area of the road boundary outside the curve or the road appurtenance in the neighborhood of the same is obtained as a reference for the determination of the driver in performing driving operations. The index is obtained as a corrected evaluation index KdBc based on which deceleration control can be executed at deceleration start timing which reflects the feel of danger that the driver has when entering a curve.

At step S405, in order to check whether the deceleration of the controlled vehicle is to be started or not, it is checked whether the present value KdBcp of the corrected evaluation index KdBc calculated at step S404 exceeds the braking discrimination reference KdBc (KdBct) or not. When the check result at step S405 is positive, the process proceeds to step S406. When the check result is negative, the process proceeds to step S401 to repeat the above steps. The braking discrimination reference KdBc (KdBct) is calculated using the following expression (31).

$$KdBc(KdBct)=-23.76\times\log_{10}D+76.96 \quad (31)$$

The braking discrimination reference KdBc (KdBct) is an approximate expression representing a relationship between a corrected evaluation index KdBc and the distance to a leading vehicle at the time when a braking operation is started. The expression may be obtained through an experiment carried out in a situation in which the controlled vehicle approaching a leading vehicle (which corresponds to the road boundary outside the curve or the road appurtenance provided in the neighborhood) and in which a test driver is instructed to start a braking operation at the very last moment when the brake could be controlled to avoid a collision with the leading vehicle. Therefore, when a normal driver starts executing deceleration control at timing for which the approximate expression serves as a threshold, a braking operation is started outside a normal region in most cases, and the vehicle will not enter the region where it will deviate from the curve.

At step S406 shown in FIG. 12, a target lateral G (Gyt) to be achieved when traveling the curving road associated with the road surface frictional coefficient µ of the curve is calculated. The target lateral G (Gyt) may be calculated based on Coulomb's laws of friction such that a sufficient lateral force can be maintained at the tires of the controlled vehicle when steering the same during the travel on the curving road.

At step S407, calculated by the following expression (32) is a target relative speed VrGyt between the controlled vehicle and the road boundary outside the curve or the road appurtenance provided in the neighborhood of the same at which the controlled vehicle can properly travel on the curve at the target lateral G (Gyt).

$$VrGyt = -(R \times Gyt)^{1/2} \tag{32}$$

At step S408, a target relative speed for the controlled vehicle at the point short of or not reaching the entrance point of the curve (target relative entrance speed VrGyt+v) is calculated. The target relative entrance speed VrGyt+v is set by adding an arbitrary relative speed v to the target relative speed VrGyt such that it exceeds the target relative speed VrGyt by the relative speed v.

Figure 13A:
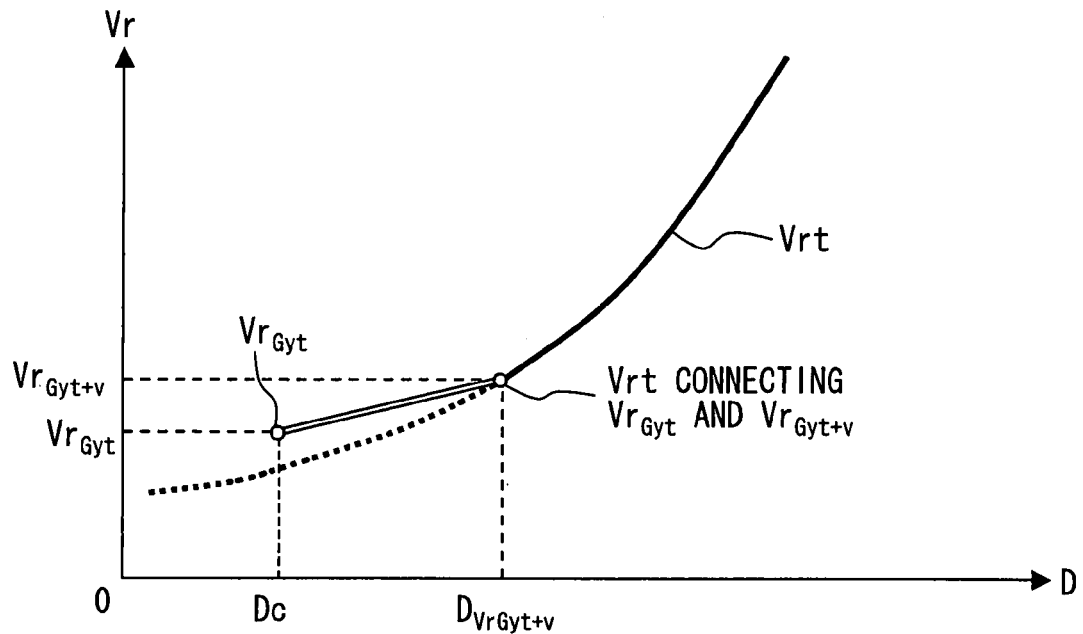
FIGS. 13A and 13B are graphs showing a method of calculating a braking discrimination reference for a curve section.

FIG. 13A is a graph of the corrected evaluation index KdBc of the expression (30). The abscissa axis represents a distance D from the controlled vehicle to the road boundary or the road appurtenance provided in the vicinity of the same along the abscissa axis, and the ordinate axis represents a relative speed Vr between the controlled vehicle and the road boundary or the road appurtenance provided in the vicinity of the same. At step S408, the distance DrGyt+v from the point short of or not reaching the entrance point of the curve as viewed from the controlled vehicle up to the road boundary or the road appurtenance provided in the neighborhood of the same is obtained. The distance is associated with the target relative entrance speed VrGyt+v in FIG. 13A. A connection line is obtained by connecting a coordinate (DrGyt+v, VrGyt+v) and a coordinate (Dc, VrGyt) with a straight line (or a curve).

Figure 13B:
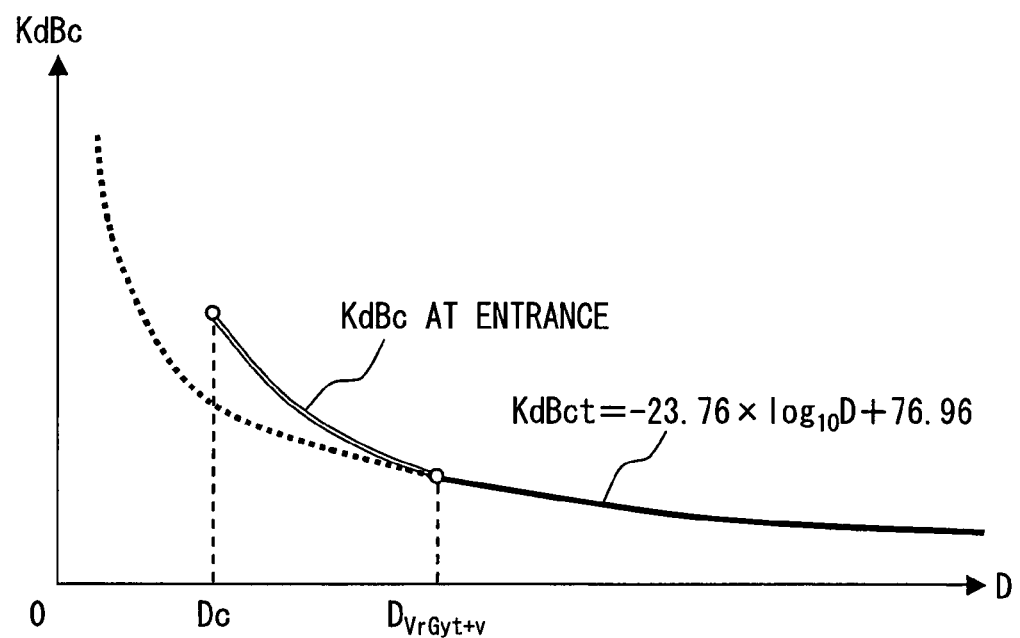

At step S409, a calculation is performed based on the connection line obtained at step S408 to obtain a braking discrimination reference which is shown in FIG. 13B along with the braking discrimination reference KdBc (KdBct) in solid and dotted lines, the braking discrimination reference applying to a section (the section indicated by Cc in FIG. 11 which is hereinafter referred to as a curve entrance section) defined from the distance DVrGyt+v from the point short of or not reaching the entrance point of the curve as viewed from the controlled vehicle up to the road boundary or the road appurtenance provided in the neighborhood of the same and the distance Dc from the entrance point of the curve up to the road boundary or the road appurtenance provided in the neighborhood of the same. Specifically, the braking discrimination reference is calculated by substituting variables (D, Vr) of the connection line in the expression (30).

As a result, the corrected evaluation index KdBc for the curve entrance section is obtained, the index having a gradient of increase larger than that of the braking discrimination reference KdBc (KdBct) which is set in advance, as indicated by the double line in FIG. 13B. In the curve entrance section, the discriminating threshold used to determine when to start braking is switched (changed) to the corrected evaluation index KdBc for the curve entrance section.

Figure 14A:
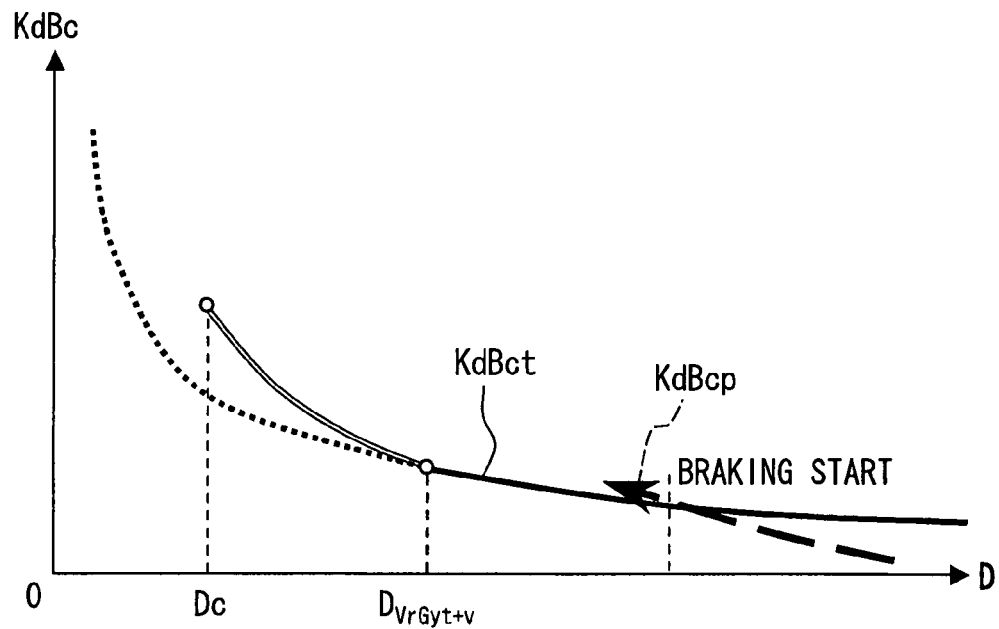
FIG. 14A is a graph for explaining determination on when to start braking to be made until a curve entrance section is reached.
Figure 14B:
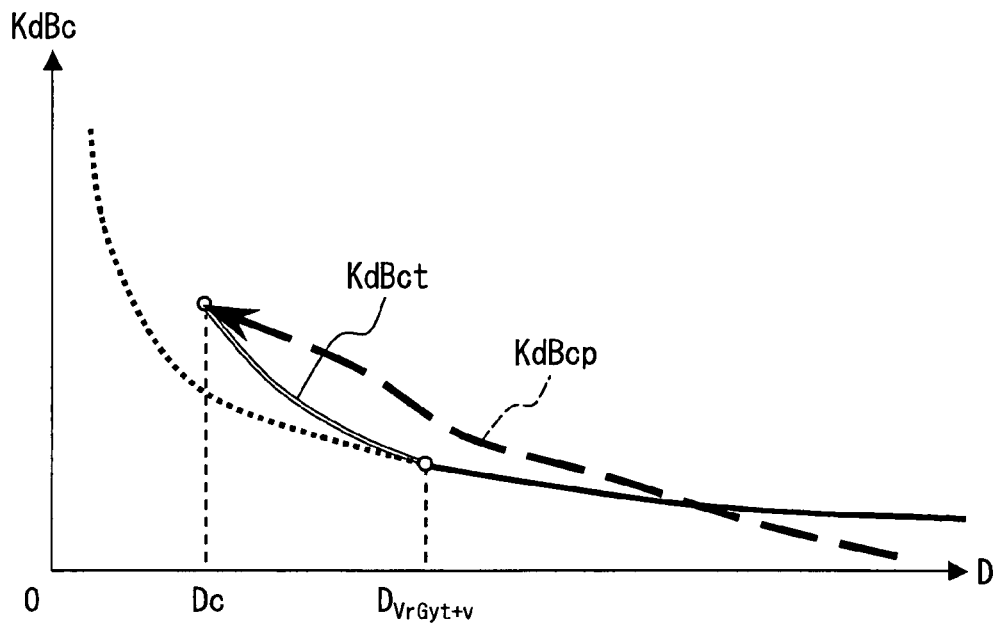
FIG. 14B is a graph for explaining determination on when to start braking to be made in the curve entrance section.

Therefore, as shown in FIG. 14A, determination on when to start braking is made using the braking discrimination reference KdBc (KdBct) indicated by the solid line until the vehicle reaches the curve entrance section. As shown in FIG. 14B, determination on when to start braking is made using the braking discrimination reference indicated by the double line in the curve entrance section.

Figure 15A:
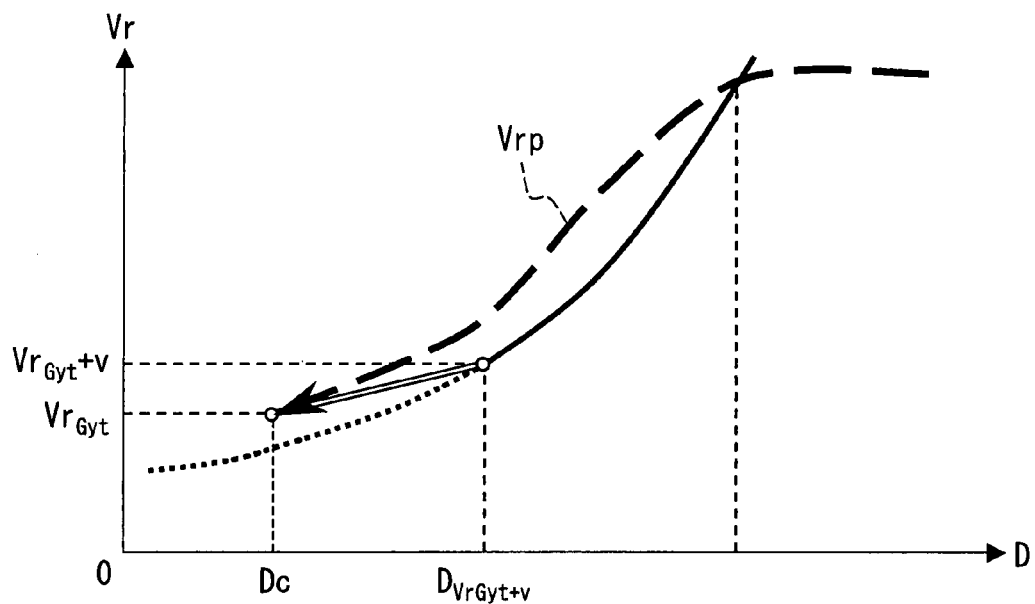
FIG. 15A is a graph for explaining a target relative speed to be achieved in traveling on a curving road and changes in a relative speed of the controlled vehicle with reference to the target relative speed.
Figure 15B:
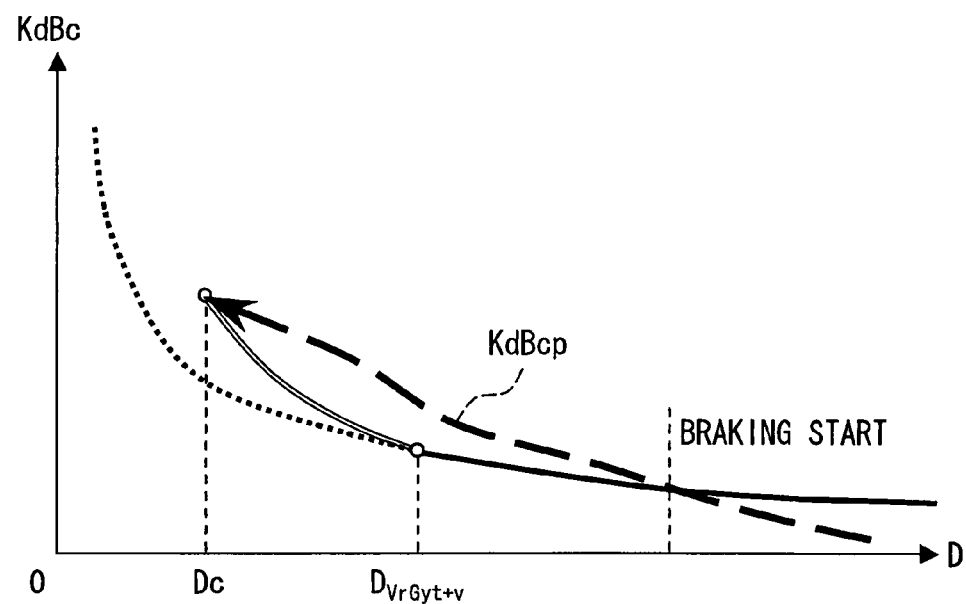
FIG. 15B is a graph for explaining changes in a present value of an index.

Thus, as shown in FIG. 15A, when the controlled vehicle enters the curving road, the speed of the controlled vehicle is reduced toward the target relative speed VrGyt at which the controlled vehicle is to travel on the curving road until the curve entrance section is reached. In the curve entrance section the vehicle is decelerated toward the target relative entrance speed VrGyt+v which is higher than the target relative speed VrGyt. As shown in FIG. 15B, the present value KdBcp of the index KdBc changes toward the point on the brake discriminating threshold KdBc at the distance DVrGyt+v until the curve entrance point is reached. In the curve entrance section, the present value changes toward the point on the braking discrimination reference indicated by the double line at the distance Dc.

At step S410 shown in FIG. 12, target deceleration rate Gx of the controlled vehicle is calculated using the following expression (33) and is output to the VSC-ECU 10 through the in-vehicle LAN. As a result, the VSC-ECU 10 controls the brake actuator such that the target deceleration rate Gx is attained. In the expression (33), T represents a divisor for converting the difference between the present relative speed Vrp of the controlled vehicle and the target relative speed Vrt (which is the speed VrGyt until the curve entrance section is reached and the speed VrGyt+v in the curve entrance section) into the target deceleration rate Gx of the controlled vehicle, and the divisor is appropriately set.

$$Gx = (Vrp - Vrt)/T \tag{33}$$

At step S411, it is checked whether the relative speed Vrp of the controlled vehicle has become lower than the target relative speed Vrt. If the determination is positive, the process is terminated. If the determination is negative, the process proceeds to step S401 to repeat the above steps.

When the controlled vehicle is about to travel on the curving road, the driving support system operating as thus described allows the speed Vs0 of the controlled vehicle to be sufficiently reduced until the vehicle reaches a point short of (not reaching) an entrance point of the curve and allows the degree of deceleration to be moderated in the curve entrance section. It is therefore possible to execute control reflecting the feel of danger that a driver will have when entering a curve.

In the third embodiment, curve information is acquired through radio communication with a road-side communication device (road-side infrastructure). The curve information may be acquired from either radar device or navigation device, and the curve information may be a combination of pieces of information obtained by such devices.

What is claimed is:

1. A vehicle control system comprising:
   a distance acquisition unit for acquiring a distance between a controlled vehicle and an appurtenance object appurtenant to a road which is located on an imaginary line extending from the controlled vehicle in a traveling direction thereof and which is provided at a boundary of a curving road existing in front of the controlled vehicle or in a neighborhood of the boundary;

an evaluation index calculation unit for calculating an evaluation index as an index representing a state of decrease or increase in the distance of the controlled vehicle to the appurtenance object, the index increasing with a relative speed at which the vehicle approaches the appurtenance object and becoming larger in a rate of increase at each relative speed as the distance to the appurtenance object becomes smaller;

a lateral acceleration acquisition unit for acquiring lateral acceleration occurring in a direction lateral to the controlled vehicle when the controlled vehicle is traveling on the curving road;

a radius of curvature acquisition unit for acquiring a radius of curvature of the curving road;

a target speed setting unit for setting a target speed at which the controlled vehicle is to travel on the curving road based on the lateral acceleration and the radius of curvature of the curving road;

a speed acquisition unit for acquiring a speed of the controlled vehicle;

a target acceleration/deceleration calculation unit for calculating a target acceleration or deceleration rate at which the controlled vehicle is to be accelerated or decelerated to reach the target speed based on the evaluation index, the distance between the appurtenance object and the controlled vehicle, the speed of the controlled vehicle, and the target speed; and a vehicle control unit for controlling acceleration or deceleration such that acceleration or deceleration occurring at the controlled vehicle equals the target acceleration or deceleration based on a result of comparison between the speed of the controlled vehicle and the target speed.

2. The vehicle control system according to claim 1, wherein the vehicle control unit controls the deceleration such that the deceleration occurring at the controlled vehicle equals the target deceleration rate when the speed of the controlled vehicle is higher than the target speed and controls acceleration such that acceleration occurring at the controlled vehicle equals the target acceleration when the speed of the controlled vehicle is lower than the target speed.

3. A vehicle control system comprising:

a distance acquisition unit for acquiring a distance between a controlled vehicle and an appurtenance object appurtenant to a road which is located on an imaginary line extending from the controlled vehicle in a traveling direction and which is provided at a boundary of a curving road existing in front of the controlled vehicle or in a neighborhood of the boundary;

a speed acquisition unit for acquiring a speed of the controlled vehicle;

a relative speed detection unit for detecting a relative speed between the road boundary or the appurtenance object and the controlled vehicle;

an evaluation index calculation unit for calculating an evaluation index as an index representing a state of decrease or increase in the distance of the road boundary or appurtenance object from the controlled vehicle so as to reflect the speed relative to the road boundary or appurtenance object, the index increasing with a relative speed at which the vehicle approaches the road boundary or the appurtenant object and becoming larger in a rate of increase at each relative speed as the distance to the road boundary or the appurtenant object becomes smaller;

a radius of curvature acquisition unit for acquiring a radius of curvature of the curving road;

a target relative speed setting unit for setting a target relative speed at which the controlled vehicle is to travel on the curving road from the radius of curvature of the curving road and a target lateral G to be achieved when the controlled vehicle travels on the curving road;

a target relative entrance speed setting unit for setting a target relative entrance speed to serve as a target for the controlled vehicle at a point short of an entrance point of the curving road based on the target relative speed, the target relative entrance speed being a relative speed higher than the target relative speed;

a curve entrance section threshold setting unit for setting a threshold for a corrected evaluation index for a curve entrance section using the target relative speed and the target relative entrance speed, the rate of increase of the corrected evaluation index in the curve entrance section from the point not reaching the entrance point of the curving road to the entrance point of the curving road being larger than the rate of increase of the threshold that is set in advance for the corrected evaluation index;

a threshold determination unit for determining whether the corrected evaluation index calculated by the evaluation index calculation unit is larger than the preset threshold for the corrected evaluation index until the controlled vehicle reaches the curve entrance section, in the curve entrance section, the threshold determination unit determining whether the corrected evaluation index calculated by the evaluation index calculation unit is larger than the threshold for the corrected evaluation index for the curve entrance section set by the curve entrance section threshold setting unit;

a target deceleration calculation unit for calculating a target deceleration rate for decelerating the controlled vehicle to the target relative speed until the controlled vehicle reaches the curve entrance section from the target relative speed, the target relative entrance speed, and the relative speed of the controlled vehicle when the threshold determination unit determines that the threshold is exceeded, the unit calculating target deceleration for decelerating the controlled vehicle to the target relative entrance speed in the curve entrance section; and a vehicle control unit for controlling deceleration such that deceleration occurring at the controlled vehicle equals the target deceleration.

* * * * *